(12) United States Patent
Chalakudi et al.

(10) Patent No.: US 11,461,768 B2
(45) Date of Patent: *Oct. 4, 2022

(54) SYSTEMS AND METHODS FOR DATA FILE TRANSFER BALANCING AND CONTROL ON BLOCKCHAIN

(71) Applicant: American Express Travel Related Services Company, Inc., New York, NY (US)

(72) Inventors: Shyamala Chalakudi, Phoenix, AZ (US); Ming Yin, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/682,180

(22) Filed: Aug. 21, 2017

(65) Prior Publication Data

US 2019/0057379 A1 Feb. 21, 2019

(51) Int. Cl.
*G06Q 20/00* (2012.01)
*G06Q 20/36* (2012.01)
(Continued)

(52) U.S. Cl.
CPC ..... *G06Q 20/3674* (2013.01); *G06Q 20/3676* (2013.01); *G06Q 20/38215* (2013.01); *H04L 9/40* (2022.05); *H04L 63/064* (2013.01); *H04L 63/0823* (2013.01); *H04L 67/06* (2013.01); *G06Q 40/04* (2013.01); *H04L 67/104* (2013.01)

(58) Field of Classification Search
None
See application file for complete search history.

(56) References Cited

U.S. PATENT DOCUMENTS 8,296,217 B1 * 10/2012 Howorka ............... G06Q 40/06
705/37
10,075,298 B2 * 9/2018 Struttmann ......... G06F 21/6218
(Continued)

OTHER PUBLICATIONS

Title : Methods and systems for transferring data over electronic networks Author: Hiltunen (Year: 2009).*
(Continued)

*Primary Examiner* — Shahid Merchant
*Assistant Examiner* — Bhavin D Shah
(74) *Attorney, Agent, or Firm* — Thomas | Horstemeyer, LLP

(57) ABSTRACT

A balance and control system may write a data file transfer confirmation from a transmitter system to a blockchain in response to the transmitter system transmitting a data file to a receiver system with the confirmation including a transmitter system address, a receiver system address, and a first hash of the data file. The system may also write a data file transfer acknowledgement from a receiver system to the blockchain with the acknowledgement including the transmitter system address, the receiver system address, and a second hash of the data file. The blockchain may execute a smart contract to compare the first hash of the data file to the second hash of the data file to identify an out-of-balance file transfer event. A monitoring device of the B&C system may read the out-of-balance file transfer event from the blockchain.

20 Claims, 3 Drawing Sheets

(51) Int. Cl.
*H04L 9/40* (2022.01)
*H04L 67/06* (2022.01)
*G06Q 20/38* (2012.01)
*H04L 67/104* (2022.01)
*G06Q 40/04* (2012.01)

(56) References Cited

U.S. PATENT DOCUMENTS

| | | | |
|---|---|---|---|
| 10,291,413 B2 | 5/2019 | Ramathal | |
| 10,374,795 B1* | 8/2019 | Giobbi | H04W 12/06 |
| 2015/0262137 A1* | 9/2015 | Armstrong | G06Q 20/0658 |
| | | | 705/41 |
| 2016/0012465 A1* | 1/2016 | Sharp | G06Q 20/386 |
| | | | 705/14.17 |
| 2016/0300223 A1* | 10/2016 | Grey | G06Q 20/3825 |
| 2017/0324711 A1* | 11/2017 | Feeney | H04L 9/3247 |
| 2018/0025181 A1* | 1/2018 | Barinov | G06F 21/645 |
| | | | 726/26 |
| 2018/0285839 A1* | 10/2018 | Yang | G06Q 20/0655 |
| 2018/0315141 A1 | 11/2018 | Hunn | |
| 2018/0349621 A1 | 12/2018 | Schvey | |
| 2019/0036698 A1 | 1/2019 | Anglin | |
| 2019/0057362 A1* | 2/2019 | Wright | G06Q 20/3829 |
| 2019/0057379 A1 | 2/2019 | Chalakudi | |
| 2019/0116142 A1 | 4/2019 | Chalakudi | |
| 2019/0116174 A1 | 4/2019 | Gray | |

OTHER PUBLICATIONS

Shyamala Chalakudi, et al., U.S. Appl. No. 15/785,843, filed Oct. 17, 2017, titled "Messaging Balancing and Control on Biockchain," 62 pages.

Shyamala Chalakudi, et al., U.S. Appl. No. 15/785,870, filed Oct. 17, 2017, titled "API Request and Response Balancing and Control on Blockchain," 46 pages.

Notice of Allowance dated Jul. 8, 2019 in U.S. Appl. No. 15/785,870.

Zyskind et al.; Decentralizing Privacy: Using Blockchain to Protect Personal Data; Published in: 2015 IEEE Security and Privacy Workshops; Date of Conference: May 21-22, 2015: IEEE Xplore (Year: 2015).

Gervais et al.; Tampering with the Delivery of Blocks and Transactions in Bitcoin; Published in CCS-15 Proceedings of the 220d ACM SIGSAC Conference on Computer and Communications Sercurity; 2015; pp. 692-705; ACM Digital Library (Year: 2015).

* cited by examiner

SYSTEMS AND METHODS FOR DATA FILE TRANSFER BALANCING AND CONTROL ON BLOCKCHAIN

FIELD

This disclosure relates to data file transfer balancing and control using a distributed database.

BACKGROUND

Data file transfer policies often include an audit of past data file transfers to determine the data file transfers were accurate. For example, auditors may check past data file transfers to verify that credit applications previously submitted to financial institutions were indeed accurate. Balancing and Control (B&C) is the process to ensure data transfer between systems is accurate, complete and on time. B&C processes may thus be implemented to ensure the accuracy, completeness, and timeliness of data file transfer between systems. A data file transfer with B&C monitoring processes in place typically involves a sending system and a receiving system both in communication with a third party intermediary. The sending system transmits the data file to the receiving system, and the sending system and receiving system send a trigger file containing B&C information to the third party, which then uses that information to validate data file transfers.

Including a third party in each data file transfer can be problematic. The third party typically uses proprietary systems and software, which increase development time and time to market on new projects that interact with the third party systems. The third party also adds application design complexity, as engineers have to implement solutions compatible with the third party systems. The third party systems also introduce an additional point of failure into the balancing and control systems. The third party may be the central authority in the balancing and control process; however, the third party may not be tamper-proof with respect to the balancing and control data it receives.

SUMMARY

A system, method, and computer readable medium (collectively, the "system") is disclosed for a balancing and control system using a distributed database (e.g., a blockchain). The system may write a data file transfer confirmation from a transmitter system to a blockchain in response to the transmitter system transmitting a data file to a receiver system with the confirmation including a transmitter system address, a receiver system address, and a first hash of the data file. The system may also write a data file transfer acknowledgement from a receiver system to the blockchain with the acknowledgement including the transmitter system address, the receiver system address, and a second hash of the data file. The blockchain may execute a smart contract to compare the first hash of the data file to the second hash of the data file to identify an out-of-balance file transfer event. A monitoring device of the system may read the out-of-balance file transfer event from the blockchain.

In various embodiments, the transmitter system address may include or be associated with a public key corresponding to a private key of an asymmetric cryptography key pair. The system may register the transmitter system with the blockchain by assigning to the transmitter system the public key and the private key of the asymmetric cryptography key pair. The transmitter system may make an API call to write the data file transfer confirmation to the blockchain. The receiver system may also make an API call to write the data file transfer acknowledgement to the blockchain. The data file transfer confirmation may include a timestamp, a file name, and an application ID. The system may generate a ticket in response to the identifying the error in the transmission of the data file.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A balance and control system based on peer-to-peer data file transfers may be used to facilitate any type of balance and control of the data file transfers without (or with minimal) third party intervention. For example, a blockchain driven peer-to-peer data file transfer network enables near-instant logging and validation of data file transfers. For a blockchain-based peer-to-peer payment data file transfer system, a governing organization or consortium may control access to data stored on the blockchain. Registration with the managing organization(s) may enable participation in the data file transfer network.

The balance and control systems described herein use a distributed database, which may be based on a blockchain and thus have consensus based transaction validation. Such balance and control systems may also enable smart contracts that enforce data file transfer workflows in a decentralized manner and keep track of completed data file transfers. The balance and control systems may also include applications deployed on user devices such as, for example, computers, tablets, smartphones, Internet of Things devices (IoT devices), etc. The applications may communicate with the blockchain to store file transfer information such as a file name, file hash, a source address, a destination address, a time stamp, an application name, an application ID, or data relating to the file transfer.

Figure 1:
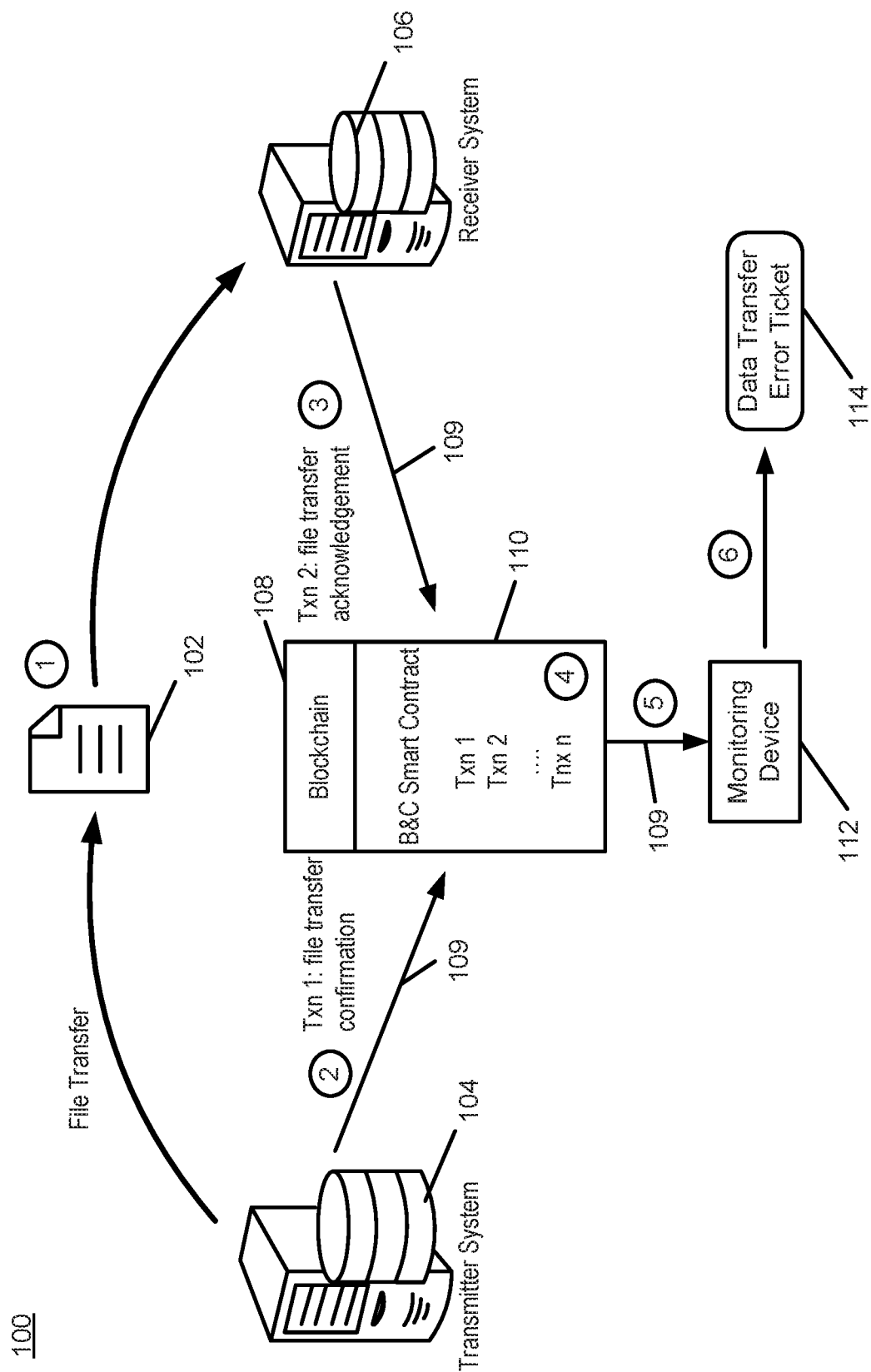
FIG. 1 illustrates an exemplary system for balancing and control using smart contracts and storing data on a blockchain, in accordance with various embodiments.
Figure 2:
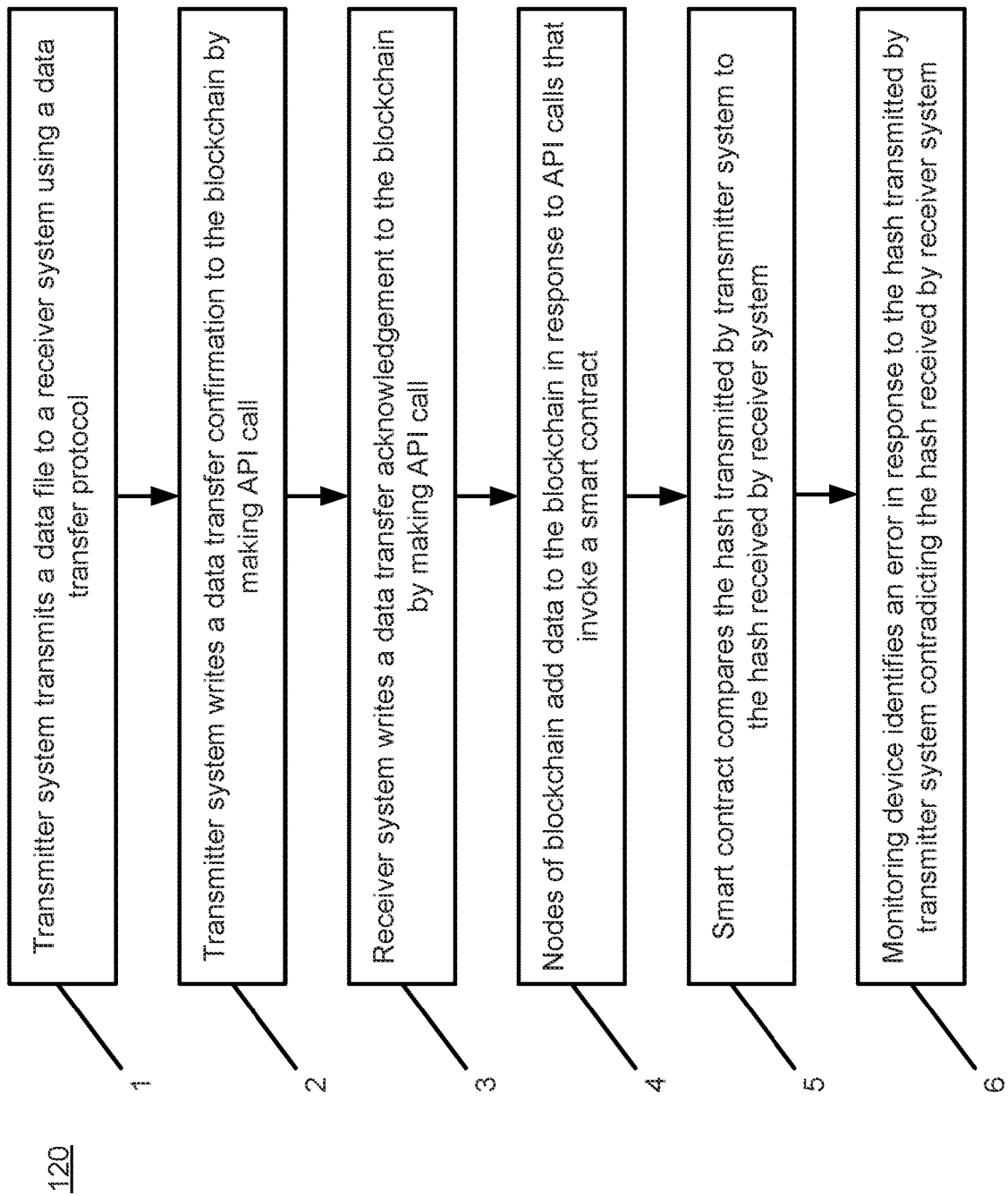
FIG. 2 illustrates a process for balancing and control using smart contracts and storing data on a blockchain, in accordance with various embodiments.

With reference to FIGS. 1 and 2, a balance and control (B&C) system 100 and a balance and control (B&C) process 120 is shown according to various embodiments. B&C system 100 may include various computing devices and data structures in communication with one another. B&C system 100 may include a data file 102 transferred using a file transfer protocol such as simple file transfer protocol, SSH file transfer protocol, FTPS, or other suitable protocol for transferring data files (Step 1).

In various embodiments, data file 102 may be transferred from a transmitter system 104 that sends data file 102 to a receiver system 106 that receives data file 102. Receiver system 106 and/or transmitter system 104 may include at least one computing device in the form of a computer or processor, or a set of computers/processors, although other types of computing units or systems may be used. Exemplary computing devices include servers, pooled servers, laptops, notebooks, hand held computers, personal digital assistants, cellular phones, smart phones (e.g., iPhone®, BlackBerry®, Android®, etc.) tablets, wearables (e.g., smart watches and smart glasses), Internet of things (IOT) devices, smart speakers, or any other device capable of receiving data over network 109. Each computing device may run applications to interact with blockchain 108, transfer files over a network with other computing devices, perform crypto operations, and otherwise operate within B&C system 100. A blockchain address may be uniquely assigned to an application or computing device to function as a unique identifier.

Blockchain 108 may be a distributed database that maintains records in a readable manner and that is resistant to tampering. The blockchain may comprise a system of interconnected blocks containing data. The blocks can hold file transfer data, smart contract data, and/or other information as desired. Each block may link to the previous block and may include a timestamp. When implemented in support of B&C system 100, the blockchain may serve as an immutable log for data file transfers and related communications. The blockchain may be a peer-to-peer network that is private, consortium and/or public in nature (e.g., Ethereum, Bitcoin, etc.). Consortium and private networks may offer improved control over the content of the blockchain and public networks may leverage the cumulative computing power of the network to improve security. In that regard, blockchain 108 may be implemented using technologies such as, for example, Ethereum GETH, eth-lightwallet, or other suitable blockchain interface technologies.

Blockchain 108 may be maintained on various nodes in the form of copies of the blockchain. Validation of data file transfer transactions may be added to the blockchain by establishing consensus between the nodes based on proof of work, proof of stake, practical byzantine fault tolerance, delegated proof of stake, or other suitable consensus algorithms.

The various electronic communications of B&C system 100 including the transfer of data file 102, writing data file transfer confirmations to blockchain 108, writing data file transfer acknowledgements to blockchain 108, and/or reading data from blockchain 108 may be accomplished using a network 109. As used herein, the term "network" includes any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

In various embodiments, transmitter system 104 may write a file transfer confirmation to the blockchain (Step 2). The confirmation may include metadata related to the file transfer as known by the transmitter system 104. The metadata for a given file transfer may include data such as, for example, a file name, file hash, a source address, a destination address, a time stamp, an application name, and/or an application ID.

In various embodiments, the source address and destination address may be blockchain addresses. Each system and/or application may have a unique blockchain address such that the blockchain address identifies systems and/or applications on a one-to-one basis. The address may thus be the public key of an asymmetric cryptography public/private key pair assigned to a system and/or application. An alias or other identifying number associated with the public key may also be used in the source and/or destination address fields.

The file hash may be the result of a hash function applied to the data file 102 by transmitter system 104. The file hash may be taken using any cryptographic hash function such as, for example, SHA-1, SHA-256, checksum, or MD5. The file hash may be compared to a file hash made by receiver system 106 by applying the same hash function as transmitter system 104 to the received data file 102. A matching hash indicates that transmitter system 104 transmitted the same data file 102 as was received at receiver system 106.

In various embodiments, receiver system may write a file transfer acknowledgement to the blockchain (Step 3). The acknowledgement may include metadata related to the file transfer as known by the receiver system 106. The metadata for a given file transfer may include data such as, for example, a file name, file hash, a source address, a destination address, a time stamp, an application name, and/or an application ID. The metadata contained in the file transfer acknowledgement from the receiver system 106 may be compared to the metadata contained in the file transfer confirmation received from the transmitter system 104.

Nodes of blockchain 108 may add data to the blockchain in response to API calls that invoke a smart contract on blockchain 108 (Step 4). A smart contract may be an executable that writes data to blockchain 108 in a predetermined format based on predetermined function parameters passed by an API call. The smart contract may thus take as an input the fields included for writing with each transaction such as, for example, file name, file hash, a source address, a destination address, a time stamp, an application name, and/or an application ID. Each of the above described file transfer confirmations and file transfer acknowledgements may be written to the blockchain as a separate transaction.

In various embodiments, blockchain 108 may host the smart contracts that autonomously govern the logging and validation of data file transfers by supporting execution and recording of the transfer data. Blockchain 108 may be based on blockchain technologies such as, for example, Ethereum, Open Chain, Chain Open Standard, etc. The smart contract controls the end-to-end flow of the system. The smart contract is also configured to maintain historic records of transactions for various data file transfers by writing a historic record of hashes and addresses on the blockchain. The smart contract may thus include a program written in a programming language such as, for example, Solidity, or any other suitable programming language.

In various embodiments, monitoring device 112 may read data blocks of blockchain 108 to find out if a particular data file transfer is in-balance or not. Monitoring device 112 may thus take the form of a computing device in electronic communication with one or more nodes of blockchain 108. Monitoring device 112 may read data blocks written to blockchain to identify the pairs of file transfer confirmations and file transfer acknowledgements based on some combination of the metadata associated with the data file transfer (e.g., file name, file hash, a time stamp, application name, and/or application ID).

Blockchain 108 may compare the file hash of data file 102 transmitted by transmitter system 104 to the file hash of data file 102 as received by receiver system 106 (Step 5). The blockchain may make the comparison using a smart contract. The comparison may determine whether the transmitted file hash and received file hash match. In response to the transmitted file hash being identical to the received file hash, monitoring device 112 may determine the data transmission of data file 102 was completed with data file 102 being unchanged between transmission from transmitter system 104 and receipt at receiver system 106. In response to the transmitted file hash being different from the received file hash, monitoring device 112 may determine the data transmission of data file 102 was completed with an error based on data file 102 being changed between transmission from transmitter system 104 and receipt at receiver system 106. The result of the comparison may be written to blockchain 108 in response to execution of a smart contract that executes the comparison. Monitoring device 112 may read blockchain 108 to determine the data transmission of data file 102 was completed with an error. For example, an error may be detected in response to not receiving a data file transfer acknowledgement from receiver system 106 for the same file within a predetermined duration from the data file transfer confirmation received for that file from transmitter system 104. The predetermined duration may be measured from the timestamp included in the data file transfer confirmation from the transmitter system 104. The timestamp may be retrieved, for example, using a web API.

Monitoring device 112 may identify an error in response to the hash transmitted by transmitter system 104 contradicting the hash received by receiver system 106 (Step 6). Two hashes may be said to contradict when the values of the hash do not match. For example, the hash value of "ADE2 5D93" contradicts the hash value of "5A60 285B" because the hash values are not the same. The foregoing 8-byte hash values serve as an example only and are not meant to be limiting. Hash functions used in the present invention may generate hash values of any size such as, for example, 16 byte, 32 byte, 64 byte, 128 byte, 256 byte, or any other suitable size hash values may be used. Identification of an error may include generating a ticket or alert identifying the file transfer that triggered the error message. The error may thus be flagged for further investigation and/or resolution.

In various embodiments, B&C system 100 may use a Hierarchical Deterministic (HD) solution and may use BIP32, BIP39, and/or BIP44, for example, to generate an HD tree of public addresses. B&C system 100 may include various computing devices configured to interact with blockchain 108 either via a blockchain client, such as GETH, or via API calls using a blockchain as a service provider, such as Microsoft Azure® or Blockapps STRATO, for example. The various computing devices of B&C system 100 may be configured to store data file transfer records and execute smart contracts using blockchain 108 for data storage and/or validation. Smart contracts may be completed by digital signature using asymmetric crypto operations and a private key, for example.

Figure 3:
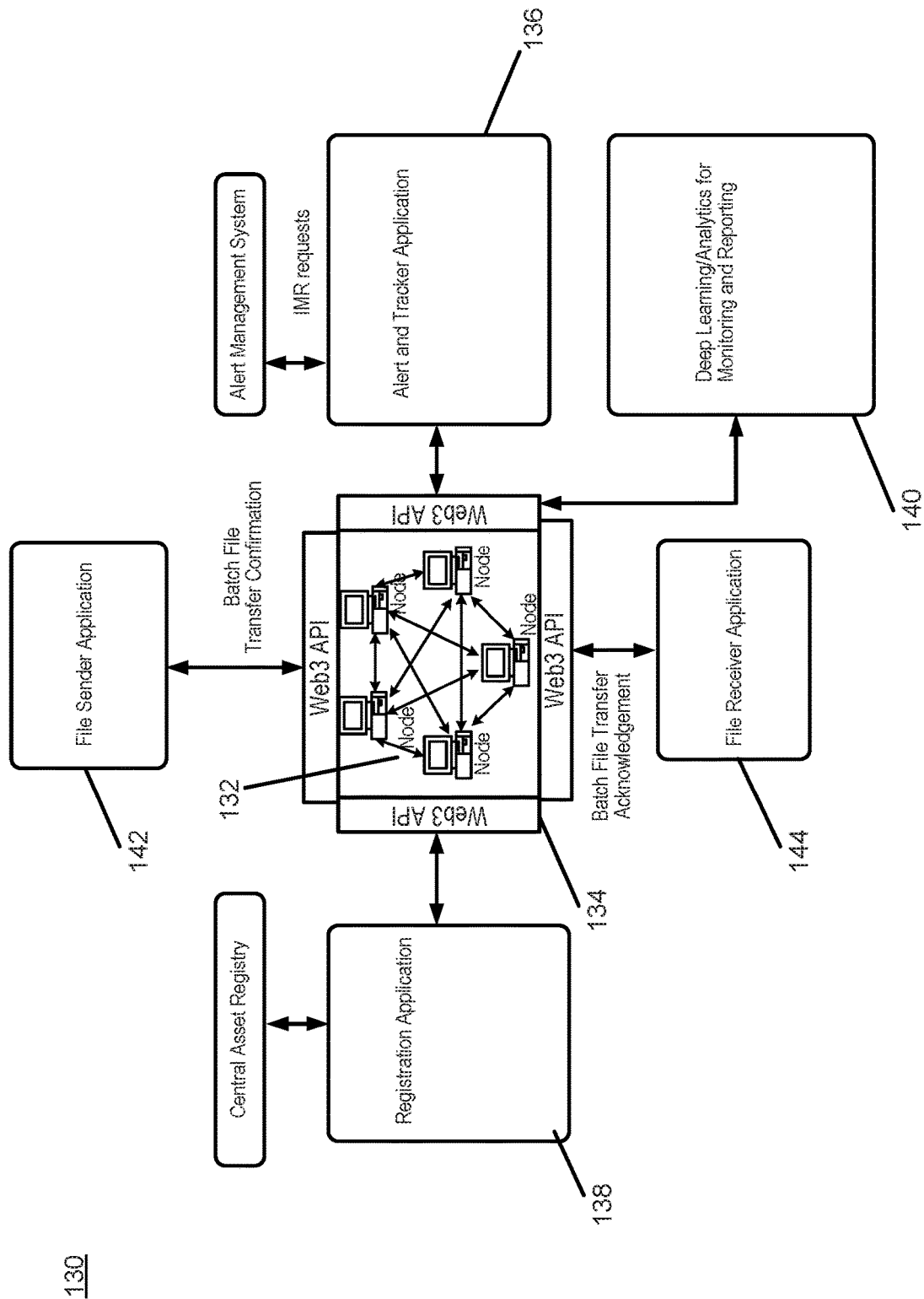
FIG. 3 illustrates system architecture for a balancing and control system using smart contracts and storing data on a blockchain, in accordance with various embodiments.

With reference to FIG. 3, system architecture 130 is shown with various software components of a computer-based a B&C system in electronic communication, in accordance with various embodiments. System architecture 130 depicts blockchain nodes 132, which maintain copies of blockchain 108 and validate new writes to the blockchain. Blockchain nodes 132 interface with outside applications and computing devices (e.g., transmitter system 104 and/or receiver system 106) using an application programming interface (API) 134 such as, for example, a web3 API compatible with the blockchain maintained by the Ethereum® consortium. API 134 may enable computing devices and applications to communicate with blockchain 108 and execute smart contracts 110 by making API calls and passing the appropriate parameters or arguments. For example, an API call to write a data file transfer confirmation to the blockchain may include transfer data such as a file name, file hash, source address, destination address, time stamp, application name, and/or an application ID.

In various embodiments, various computing devices and applications (e.g., monitoring device 112, transmitter system 104, and/or receiver system 106) may also communicate with blockchain 108 using API 134. Transmitter system 104 may run a file sender application 142 that communicates with blockchain 108 by making API calls using API 134. Receiver system 106 may run a file receiver application 144 that communicates with blockchain 108 by making API calls using API 134. File sender application 142 and/or file receiver application 144 may register with blockchain 108 using an application registration system 138 that assigns a unique blockchain address and/or a unique public/private cryptographic key pair to each application. The blockchain address, public key, and/or private key may be stored in a central asset registry or application inventory system in association with an identifier (e.g., an application ID) that identifies the registered application. The blockchain address, public key, and/or private key may thus serve as a unique identifier for registered applications based on the one-to-one relationship between the registered application and corresponding blockchain address, public key, and/or private key.

In various embodiments, monitoring device 112 may run an alert and tracker application 136. Blockchain 108 may execute a smart contract to carry out the comparison between the transmitter's hash and receiver's hash received by blockchain 108. The smart contract of blockchain 108 may thus identify out-of-balance file transfer events based on the results of the hash comparison. The result of the comparison may be pushed to alert and tracker application 136 running on monitoring device 112 by way of an API to identify an out-of-balance file transfer event. Alert and tracker application 136 may identify an out-of-balance file transfer event in response to the first hash of the data file conflicting (i.e., not matching) with the second hash of the data file by consuming the notifications received from blockchain 108. Alert and tracker application 136 may read the results of the comparison received from blockchain 108 to detect the result of the comparison between the first hash and the second hash of the data file.

In various embodiments, a smart contract of blockchain 108 may also compare the hash value of specific field(s) in the data file before and/or after the file transfer. The additional hash value comparison may help to identify what field(s) caused the out-of-balance file transfer event. The smart contract of blockchain 108 may also invoke another smart contract for scheduled jobs (See e.g., http://www.ethereum-alarm-clock.com/ for scheduled jobs in the Ethereum consortium). In that regard, the smart contract can also detect another out-of-balance scenario such as where the receiver did not receive the file transmitted from the transmitter within a predefined time window.

In various embodiments, additional supporting applications and computing devices in communication with blockchain nodes 132 via API 134 may include an analytics application 140 for a monitoring and reporting system. The analytics application 140 may thus support a dashboard application to present insights relating to conforming and nonconforming data file transfers. The analytics application may run at least partially on a big data management system and/or a distributed computing cluster.

A B&C network based on a blockchain, as described herein, may simplify B&C operations by using the blockchain as a distributed and tamper-proof data store. The verification process for data file transfers may be near-instant. The solution may be integrated into ecommerce platforms reliant on accurate data file transfers such as, for example, credit applications. Transparency is very high for various embodiments using a consortium or public blockchain since validation is performed, for example, using data stored by a decentralized autonomous organization (DAO) instead of a specific financial institution.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A distributed computing cluster and/or big data management system may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data file transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, "transmit" may include sending electronic data from one system component to another over a network connection. Additionally, as used herein, "data" may include encompassing information such as commands, queries, files, data for storage, and the like in digital or any other form.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIG. 2, the process flows and screen-shots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The disclosure and claims do not describe only a particular outcome of validating and logging data file transfers, but the disclosure and claims include specific rules for implementing the outcome of validating and logging data file transfers and that render information into a specific format that is then used and applied to create the desired results of validating and logging data file transfers, as set forth in McRO, Inc. v. Bandai Namco Games America Inc. (Fed. Cir. case number 15-1080, Sep. 13, 2016). In other words, the outcome of validating and logging data file transfers can be performed by many different types of rules and combinations of rules, and this disclosure includes various embodiments with specific rules. While the absence of complete preemption may not guarantee that a claim is eligible, the disclosure does not sufficiently preempt the field of validating and logging data file transfers at all. The disclosure acts to narrow, confine, and otherwise tie down the disclosure so as not to cover the general abstract idea of just validating and logging data file transfers. Significantly, other systems and methods exist for validating and logging data file transfers, so it would be inappropriate to assert that the claimed invention preempts the field or monopolizes the basic tools of validating and logging data file transfers. In other words, the disclosure will not prevent others from validating and logging data file transfers, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   writing, by a balancing and control (B&C) computer system to a blockchain, a data file transfer confirmation in response to a transmitter computer system transmitting a data file to a receiver computer system in a peer to peer data transmission between the transmitter computer system and the receiver computer system and submitting the data file transfer confirmation to the B&C computer system, wherein the data file transfer confirmation comprises a transmitter computer system address, a receiver computer system address, and a first hash of the data file, wherein the transmitter computer system and the receiver computer system are not part of a blockchain network of computers that implement the blockchain;
   writing, by the B&C computer system to the blockchain, a data file transfer acknowledgement in response to the receiver computer system receiving the data file from the transmitter computer system and submitting the data file transfer acknowledgment to the B&C computer system, wherein the data file transfer acknowledgement comprises the transmitter computer system address, the receiver computer system address, and a second hash of the data file;
   identifying, by the B&C computer system, the data file transfer confirmation and the data file transfer acknowledgement as being a related pair based at least in part on a combination of metadata included in both the data file transfer confirmation and the data file transfer acknowledgment;
   executing, by the B&C computer system, a smart contract to compare the first hash of the data file included in the data file transfer confirmation to the second hash of the data file included in the data file transfer acknowledgment to identify an out-of-balance file transfer event with respect to a transfer of the data file between the transmitter computer system and the receiver computer system;
   writing, by the B&C computer system to the blockchain, a notification of the out-of-balance file transfer event; and
   reading, by a monitoring device and from the blockchain, the notification of the out-of-balance file transfer event, wherein the blockchain comprises a system of interconnected records containing data file transfer data, wherein the data file transfer data comprises the data file transfer acknowledgment, the data file transfer confirmation, and the smart contract that are written to the blockchain as separate transactions,
   wherein the first hash and the second hash are based on a cryptographic hash function.

2. The method of claim 1, wherein the transmitter computer system address comprises a public key corresponding to a private key of an asymmetric cryptography key pair.

3. The method of claim 2, further comprising registering, by the B&C computer system to the blockchain, the transmitter computer system by assigning to the transmitter computer system the public key and the private key of the asymmetric cryptography key pair.

4. The method of claim 1, wherein the transmitter computer system makes an application programing interface (API) call to write the data file transfer confirmation to the blockchain.

5. The method of claim 1, wherein the receiver computer system makes an API call to write the data file transfer acknowledgement to the blockchain.

6. The method of claim 1, wherein the data file transfer confirmation further comprises a timestamp, a file name, and an application identifier (ID).

7. The method of claim 1, further comprising generating, by the monitoring device, a ticket in response to the out-of-balance file transfer event.

8. A computer-based system for balancing and control of data file transfers, comprising:
- a processor;
- a tangible, non-transitory memory configured to communicate with the processor, the tangible, non-transitory memory having instructions stored thereon that, in response to execution by the processor, cause the balancing and control (B&C) computer system to perform operations comprising:
  - writing, by the B&C computer system to a blockchain, a data file transfer confirmation in response to a transmitter computer system transmitting a data file to a receiver computer system in a peer to peer data transmission between the transmitter computer system and the receiver computer system and submitting the data file transfer confirmation to the B&C computer system, wherein the data file transfer confirmation comprises a transmitter computer system address, a receiver computer system address, and a first hash of the data file, wherein the transmitter computer system and the receiver computer system are not part of a blockchain network of computers that implement the blockchain;
  - writing, by the B&C computer system to the blockchain, a data file transfer acknowledgement in response to the receiver computer system receiving the data file from the transmitter computer system and submitting the data file transfer acknowledgment to the B&C computer system, wherein the data file transfer acknowledgement comprises the transmitter computer system address, the receiver computer system address, and a second hash of the data file;
  - identifying, by the B&C computer system, the data file transfer confirmation and the data file transfer acknowledgement as being a related pair based at least in part on a combination of metadata included in both the data file transfer confirmation and the data file transfer acknowledgment;
  - executing, by the B&C computer system, a smart contract to compare the first hash of the data file included in the data file transfer confirmation to the second hash of the data file included in the data file transfer acknowledgment to identify an out-of-balance file transfer event with respect to a transfer of the data file between the transmitter computer system and the receiver computer system;
  - writing, by the B&C computer system to the blockchain, a notification of the out-of-balance file transfer event; and
  - reading, by a monitoring device and from the blockchain, the notification of the out-of-balance file transfer event,
  - wherein the blockchain comprises a system of interconnected records containing data file transfer data, wherein the data file transfer data comprises the data file transfer acknowledgment, the data file transfer confirmation, and the smart contract that are written to the blockchain as separate transactions,
  - wherein the first hash and the second hash are based on a cryptographic hash function.

9. The computer-based system of claim 8, wherein the transmitter computer system address comprises a public key corresponding to a private key of an asymmetric cryptography key pair.

10. The computer-based system of claim 9, further comprising registering, by the computer-based system, the transmitter computer system with the blockchain by assigning to the transmitter computer system the public key and the private key of the asymmetric cryptography key pair.

11. The computer-based system of claim 8, wherein the transmitter computer system makes an API call to write the data file transfer confirmation to the blockchain.

12. The computer-based system of claim 8, wherein the receiver computer system makes an API call to write the data file transfer acknowledgement to the blockchain.

13. The computer-based system of claim 8, wherein the data file transfer confirmation further comprises a timestamp, a file name, and an application ID.

14. The computer-based system of claim 8, further comprising generating, by the computer-based system, a ticket in response to the identifying the out-of-balance file transfer event.

15. An article of manufacture including a non-transitory, tangible computer readable storage medium having instructions stored thereon that, in response to execution by a balancing and control (B&C) computer system, cause the B&C computer system to perform operations comprising:
- writing, by the B&C computer system to a blockchain, a data file transfer confirmation in response to a transmitter computer system transmitting a data file to a receiver computer system in a peer to peer data transmission between the transmitter computer system and the receiver computer system and submitting the data file transfer confirmation to the B&C computer system, wherein the data file transfer confirmation comprises a transmitter computer system address, a receiver computer system address, and a first hash of the data file, wherein the transmitter computer system and the receiver computer system are not part of a blockchain network of computers that implement the blockchain;
- writing, by the B&C computer system to the blockchain, a data file transfer acknowledgement in response to the receiver computer system receiving the data file from the transmitter computer system and submitting the data file transfer acknowledgment to the B&C computer system, wherein the data file transfer acknowledgement comprises the transmitter computer system address, the receiver computer system address, and a second hash of the data file;
- identifying, by the B&C computer system, the data file transfer confirmation and the data file transfer acknowledgement as being a related pair based at least in part on a combination of metadata included in both the data file transfer confirmation and the data file transfer acknowledgment;
- executing, by the B&C computer system, a smart contract to compare the first hash of the data file included in the data file transfer confirmation to the second hash of the data file included in the data file transfer acknowledgment to identify an out-of-balance file transfer event with respect to a transfer of the data file between the transmitter computer system and the receiver computer system;
- writing, by the B&C computer system to the blockchain, a notification of the out-of-balance file transfer event; and
- reading, by a monitoring device and from the blockchain, the notification of the out-of-balance file transfer event,
- wherein the blockchain comprises a system of interconnected records containing data file transfer data, wherein the data file transfer data comprises the data file transfer acknowledgment, the data file transfer confirmation, and the smart contract that are written to the blockchain as separate transactions;

wherein the first hash and the second hash are based on a cryptographic hash function.

16. The article of claim 15, wherein the transmitter computer system address comprises a public key corresponding to a private key of an asymmetric cryptography key pair.

17. The article of claim 16, further comprising registering, by the B&C computer system, the transmitter computer system with the blockchain by assigning to the transmitter computer system the public key and the private key of the asymmetric cryptography key pair.

18. The article of claim 15, wherein the transmitter computer system makes an API call to write the data file transfer confirmation to the blockchain.

19. The article of claim 15, wherein the data file transfer confirmation further comprises a timestamp, a file name, and an application ID.

20. The article of claim 15, further comprising generating, by the B&C computer system, a ticket in response to the identifying the out-of-balance file transfer event.

* * * * *